(12) United States Patent
Venkatraman et al.

(10) Patent No.: US 9,252,916 B2
(45) Date of Patent: Feb. 2, 2016

(54) MOBILE VIDEO DELIVERY

(75) Inventors: Srinivasan Venkatraman, Belmont, MA (US); Anand Krishnamurthy, Acton, MA (US); Jae Chung, Lexington, MA (US); Paul Sherer, Danville, CA (US); Deepak Garg, Nashua, NH (US)

(73) Assignee: AFFIRMED NETWORKS, INC., Acton, MA (US)

(*) Notice: Subject to any disclaimer, the term of this patent is extended or adjusted under 35 U.S.C. 154(b) by 208 days.

(21) Appl. No.: 13/372,400

(22) Filed: Feb. 13, 2012

(65) Prior Publication Data
US 2013/0212630 A1 Aug. 15, 2013

(51) Int. Cl.
| | |
|---|---|
| H04N 7/16 | (2011.01) |
| H04N 7/173 | (2011.01) |
| H04L 1/00 | (2006.01) |
| H04N 21/2343 | (2011.01) |
| H04N 21/24 | (2011.01) |
| H04N 21/44 | (2011.01) |
| H04N 21/442 | (2011.01) |
| H04N 21/845 | (2011.01) |
| H04L 29/06 | (2006.01) |

(52) U.S. Cl.
CPC .......... *H04L 1/0014* (2013.01); *H04L 65/4069* (2013.01); *H04N 21/23439* (2013.01); *H04N 21/2402* (2013.01); *H04N 21/44004* (2013.01); *H04N 21/44209* (2013.01); *H04N 21/8456* (2013.01); *H04L 65/80* (2013.01)

(58) Field of Classification Search
USPC .............................. 725/62, 86, 87, 90, 93–96
See application file for complete search history.

(56) References Cited

U.S. PATENT DOCUMENTS

| | | |
|---|---|---|
| 6,557,030 B1 | 4/2003 | Hoang |
| 6,950,624 B2 | 9/2005 | Kim et al. |
| 7,346,840 B1 | 3/2008 | Ravishankar et al. |
| 7,466,694 B2 | 12/2008 | Xu et al. |
| 7,734,746 B2 | 6/2010 | Ng et al. |
| 7,796,514 B2 * | 9/2010 | Noriega ........................ 370/230 |
| 7,962,181 B2 | 6/2011 | Gielow et al. |
| 7,991,904 B2 | 8/2011 | Melnyk et al. |
| 8,064,909 B2 | 11/2011 | Spinelli et al. |
| 8,516,144 B2 | 8/2013 | Hsu |
| 8,527,647 B2 | 9/2013 | Gopalakrishnan |
| 2002/0023048 A1 | 2/2002 | Buhannic et al. |

(Continued)

OTHER PUBLICATIONS

International Search Report and Written Opinion issued by the U.S. Patent and Trademark Office as International Searching Authority for International Application No. PCT/US2012/025577 mailed May 21, 2012 (7 pgs.).

(Continued)

*Primary Examiner* — Nasser Goodarzi
*Assistant Examiner* — Fred Peng
(74) *Attorney, Agent, or Firm* — Wilmer Cutler Pickering Hale and Dorr LLP

(57) ABSTRACT

Methods and apparatus, including computer program products, for mobile video delivery. A method includes, in a mobile network comprising at least a core element and one or more evolved Node Bs (eNBs), receiving a request to initiate a progressive download of a video object, splitting the requested video object into self-contained independent video segments, transrating each of the self-contained independent video segments for different rates, and delivering a segment from a rate bucket that matches a current network condition determined by bandwidth estimation.

10 Claims, 4 Drawing Sheets

(56) References Cited

U.S. PATENT DOCUMENTS

| | | |
|---|---|---|
| 2002/0154751 A1 | 10/2002 | Thompson et al. |
| 2002/0169797 A1 | 11/2002 | Hegde et al. |
| 2003/0171114 A1 | 9/2003 | Hastings |
| 2003/0187982 A1 | 10/2003 | Petit |
| 2004/0131023 A1 | 7/2004 | Auterinen |
| 2004/0267758 A1 | 12/2004 | Katsurashima |
| 2005/0136832 A1 | 6/2005 | Spreizer |
| 2006/0013191 A1 | 1/2006 | Kavanagh |
| 2006/0029062 A1 | 2/2006 | Rao et al. |
| 2006/0045008 A1 | 3/2006 | Sun et al. |
| 2006/0168655 A1 | 7/2006 | Grandmaitre et al. |
| 2006/0277569 A1 | 12/2006 | Smith |
| 2006/0294238 A1 | 12/2006 | Naik et al. |
| 2007/0101377 A1 | 5/2007 | Six et al. |
| 2007/0180135 A1 | 8/2007 | Kenrick et al. |
| 2008/0039010 A1 | 2/2008 | Vance et al. |
| 2008/0052206 A1 | 2/2008 | Edwards et al. |
| 2008/0052348 A1 | 2/2008 | Adler et al. |
| 2008/0077465 A1 | 3/2008 | Schimpf et al. |
| 2008/0114894 A1 | 5/2008 | Deshpande |
| 2008/0181208 A1* | 7/2008 | Maes ............... 370/389 |
| 2008/0201772 A1 | 8/2008 | Mondaeev et al. |
| 2008/0240082 A1 | 10/2008 | Feldman et al. |
| 2008/0256129 A1 | 10/2008 | Salinas et al. |
| 2009/0044024 A1 | 2/2009 | Oberheide et al. |
| 2009/0094113 A1 | 4/2009 | Berry et al. |
| 2009/0109845 A1 | 4/2009 | Andreasen et al. |
| 2009/0135752 A1 | 5/2009 | Su et al. |
| 2009/0156213 A1 | 6/2009 | Spinelli et al. |
| 2009/0157480 A1 | 6/2009 | Smith |
| 2009/0187939 A1 | 7/2009 | Lajoie |
| 2009/0210899 A1 | 8/2009 | Lawrence-Apfelbaum et al. |
| 2009/0286560 A1 | 11/2009 | Willis |
| 2009/0300173 A1 | 12/2009 | Bakman et al. |
| 2010/0035587 A1 | 2/2010 | Bennett |
| 2010/0066804 A1 | 3/2010 | Shoemake et al. |
| 2010/0128708 A1 | 5/2010 | Liu et al. |
| 2010/0157990 A1 | 6/2010 | Krzyzanowski et al. |
| 2010/0167816 A1 | 7/2010 | Perlman et al. |
| 2010/0188975 A1 | 7/2010 | Raleigh |
| 2010/0189004 A1 | 7/2010 | Mirandette et al. |
| 2010/0218214 A1 | 8/2010 | Fan et al. |
| 2010/0238840 A1 | 9/2010 | Lu et al. |
| 2010/0251384 A1 | 9/2010 | Yen |
| 2010/0312861 A1 | 12/2010 | Kolhi et al. |
| 2010/0317331 A1 | 12/2010 | Miller |
| 2011/0019584 A1 | 1/2011 | Raghavendran et al. |
| 2011/0026584 A1* | 2/2011 | Zhang et al. ............ 375/240.02 |
| 2011/0060851 A1 | 3/2011 | Monchiero et al. |
| 2011/0069799 A1 | 3/2011 | Wolfe et al. |
| 2011/0075557 A1 | 3/2011 | Chowdhury et al. |
| 2011/0075675 A1 | 3/2011 | Koodli et al. |
| 2011/0082924 A1 | 4/2011 | Gopalakrishnan |
| 2011/0211465 A1 | 9/2011 | Farrugia et al. |
| 2011/0243106 A1* | 10/2011 | Hsu et al. ............... 370/336 |
| 2011/0283011 A1 | 11/2011 | Li et al. |
| 2011/0299395 A1 | 12/2011 | Mariblanca Nieves |
| 2011/0320592 A1 | 12/2011 | Kemmerer, Jr. et al. |
| 2012/0082132 A1 | 4/2012 | Andreasen et al. |
| 2012/0190331 A1 | 7/2012 | Ahmed et al. |
| 2012/0233247 A1* | 9/2012 | Ashrafi ............... 709/203 |
| 2012/0281540 A1 | 11/2012 | Khan et al. |
| 2013/0013800 A1 | 1/2013 | Brueck et al. |
| 2013/0042015 A1 | 2/2013 | Begen et al. |
| 2013/0114408 A1* | 5/2013 | Sastry et al. ............ 370/231 |
| 2013/0136000 A1* | 5/2013 | Torres et al. ............ 370/235 |
| 2013/0137469 A1 | 5/2013 | Schmidt et al. |
| 2013/0173804 A1 | 7/2013 | Murthy et al. |
| 2013/0177012 A1 | 7/2013 | Ku et al. |
| 2013/0208702 A1* | 8/2013 | Sandberg ............... 370/331 |
| 2013/0212280 A1* | 8/2013 | Chesson ............... 709/226 |
| 2013/0226565 A1 | 8/2013 | Sung et al. |

OTHER PUBLICATIONS

International Search Report and Written Opinion issued by the U.S. Patent and Trademark Office as International Searching Authority for International Application No. PCT/US2012/021520 mailed May 8, 2012 (8 pgs.).

International Search Report issued by the U.S. Patent and Trademark Office as International Searching Authority for International Application No. PCT/US2011/062558 mailed Apr. 5, 2012 (4 pgs.).

International Search Report and Written Opinion issued by the U.S. Patent and Trademark Office as International Searching Authority for International Application No. PCT/US2011/055183 mailed Mar. 8, 2012 (9 pgs.).

Extended European Search Report issued by the European Patent Office for European Patent Application No. 12868887.6 dated Sep. 9, 2015 (8 pgs.).

Widjaja, I. and La Roche, H., "Sizing X2 Bandwidth for Inter-Connected eNBs," Vehicular Technology Conference Fall, 70th IEEE, Piscataway, NJ, USA, 5 pgs. (Sep. 20, 2009).

* cited by examiner

100

Receive a request to initiate
a progressive download of
a video object
102

↓

Split the requested video
object into self-contained
independent video segments
104

↓

Transrate each of the self-contained
independent video segments for
different rates
106

↓

Deliver a segment from a rate
bucket that matches a current
network condition determined
by bandwidth estimation
108

FIG. 3

MOBILE VIDEO DELIVERY

BACKGROUND OF THE INVENTION

The invention generally relates to wireless networks, and more specifically to mobile video delivery.

In general, progressive download refers to video delivered by a regular Hypertext Transfer Protocol (HTTP) web server rather than a streaming server. In most instances, video delivered using this technique is stored on a viewer's hard drive as it's received, and then it's played from the hard drive. In contrast, streaming video is usually not stored (also called cached) locally, so if the viewer can't retrieve and play it in real time, he or she can't play it smoothly at all.

HTTP Progressive download is the most common mode of delivering video from the Internet today. Unfortunately, this delivery method does not respond to changing network conditions, which can affect the end user experience. Consider a case where a HTTP PD video object is encoded at 720p. If the network conditions are bad, the video will take a long time to be downloaded and video player will stall waiting for additional frames. For such conditions, the object has to be encoded at a lower rate (perhaps 360p). Similarly, if the network conditions improve, the streamer has to start sending higher quality video segments.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides methods and apparatus, including computer program products, for mobile video delivery.

In general, in one aspect, the invention features a method including, in a mobile network comprising at least a core element and one or more evolved Node Bs (eNBs), receiving a request to initiate a progressive download of a video object, splitting the requested video object into self-contained independent video segments, transrating each of the self-contained independent video segments for different rates, and delivering a segment from a rate bucket that matches a current network condition determined by bandwidth estimation.

In another aspect, the invention features a server in a mobile network including one or more central processing units (CPUs), and a memory, the memory including an operating system (OS) and a mobile video delivery process, the mobile video delivery process including receiving a request to initiate a progressive download of a video object, splitting the requested video object into self-contained independent video segments, transrating each of the self-contained independent video segments for different rates, and delivering a segment from a rate bucket that matches a current network condition determined by bandwidth estimation.

Other features and advantages of the invention are apparent from the following description, and from the claims.

BRIEF DESCRIPTION OF THE DRAWINGS

The invention will be more fully understood by reference to the detailed description, in conjunction with the following figures, wherein:

FIG. 3 is a flow diagram.

DETAILED DESCRIPTION

Figure 1:
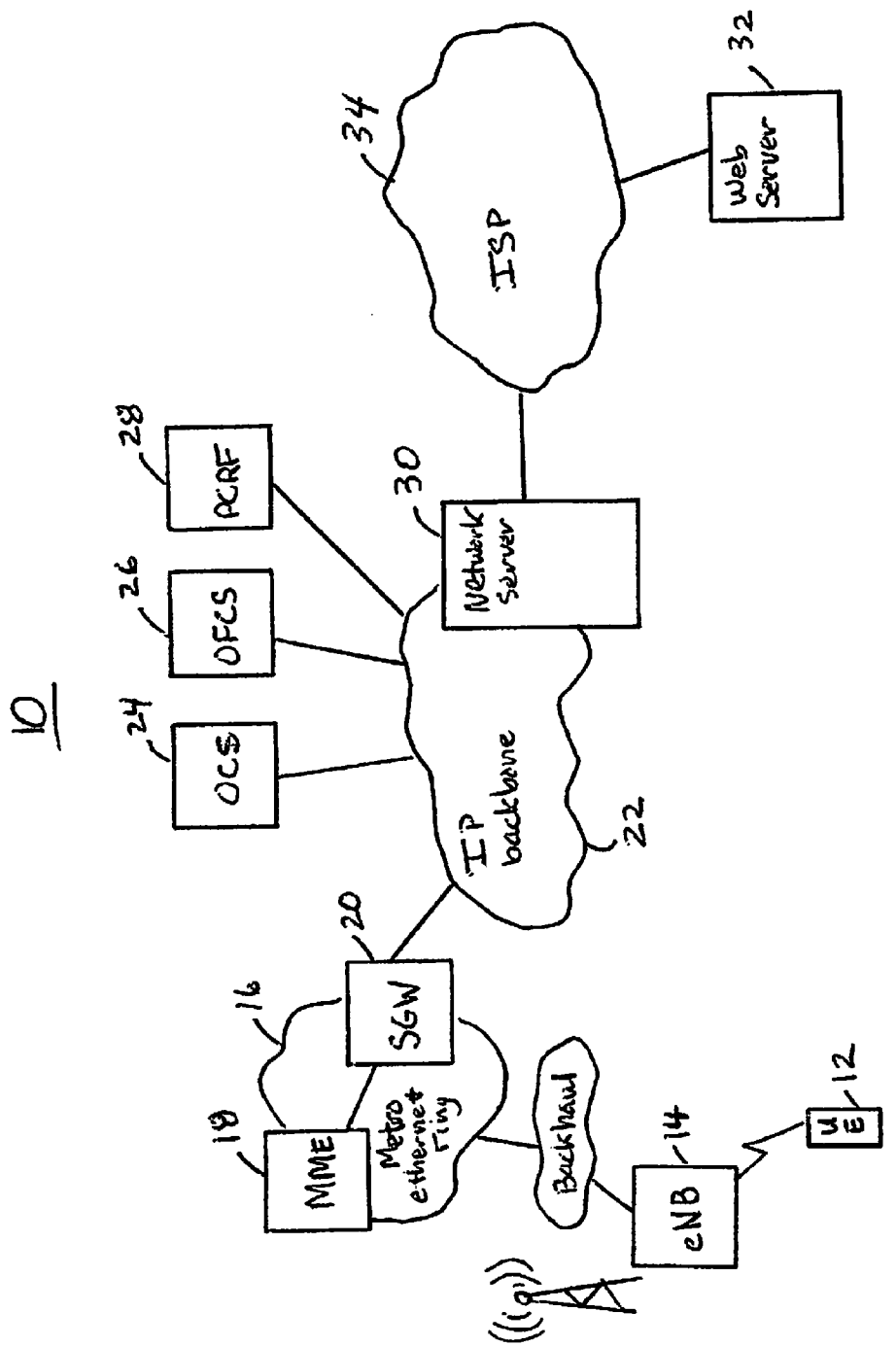
FIG. 1 is a block diagram.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," "subscriber station," "communication device," "access terminal," "terminal," "handset," and similar terminology, refer to a wireless device (e.g., cellular phone, smart phone, computer, personal digital assistant (PDA), set-top box, Internet Protocol Television (IPTV), electronic gaming device, printer, etc.) utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms.

This invention described herein applies to all wireless networks regardless of access technology, including Global System for Mobile (GSM), Code Division Multiple Access (CDMA), Long Term Evolution (LTE), WiMAX and so forth. For ease of explanation, the invention will be described in a 4G network environment.

As shown in FIG. 1, an exemplary mobile network 10 includes user equipment (UE) 12, such as a smart phone. Other examples of US 12 include, but are not limited to, cellular phone, computer, personal digital assistant (PDA), set-top box, Internet Protocol Television (IPTV), electronic gaming device, printer, tablet, Wi-Fi Hotspot and so forth. The UE 12 is wirelessly linked to an Evolved Node B (eNB) 14. The eNB 14 is a radio part of a cell site. A single eNB may contain several radio transmitters, receivers, control sections and power supplies. The eNB 14 is backhauled to a metro ethernet ring 16, which includes a Mobility Management Entity (MME) 18 and a Serving Gateway (SGW) 20. Backhaul is a process of transferring packets or communication signals over relatively long distances to a separate location for processing. The SGW 20 routes and forwards user data packets, while also acting as the mobility anchor for a user plane during inter-eNodeB handovers.

The SGW 20 is linked to an Internet Protocol (IP) backbone 22. The IP backbone 22 includes links to a Online Charging System (OCS) 24, an Offline Charging Subsystem (OFCS) 26 and a Policy Control and Charging Function (PCRF) 28. In general, the OCS 24 is a set of interconnected network elements that enable the identification, rating and posting of charges in real time (or near real time). The OFCS 26 receives charging data in the form of Call Detail Records (CDRs) and Diameter accounting messages from network elements after the subscriber incurs network resource usage.

The IP backbone 22 includes a network server 30 that implements virtualized open wireless services software architecture for 3G and 4G mobile networks. The network server 30 is linked to a web server 32 through an Internet Service Provider (ISP) 34.

Figure 2:
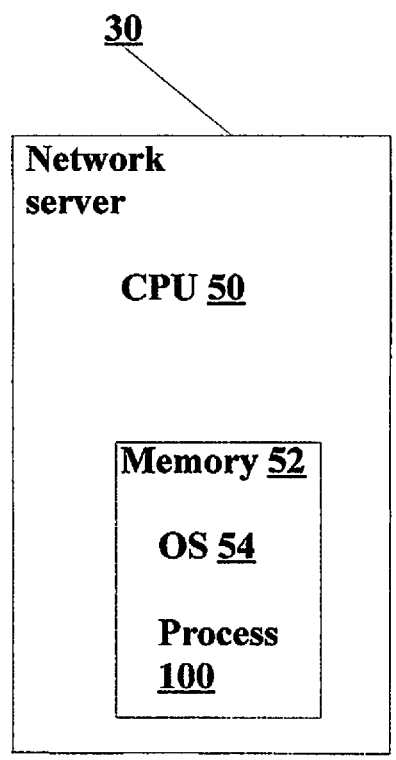
FIG. 2 is a block diagram.

As shown in FIG. 2, the network server 30 includes at least a central processing unit (CPU) 50 and a memory 52. Memory 52 includes at least an operating system (OS) 54, such as Linux, and mobile video delivery process 100, described below.

As shown in FIG. 3, the mobile video delivery process 100 includes receiving (102) a request to initiate a progressive download of a video object.

The mobile video delivery process 100 splits (104) the requested video object into self-contained independent video segments.

The mobile video delivery process 100 transrates (106) each of the self-contained independent video segments for different rates.

The mobile video delivery process 100 delivers (108) a segment from a rate bucket that matches a current network condition determined by bandwidth estimation.

Figure 4:
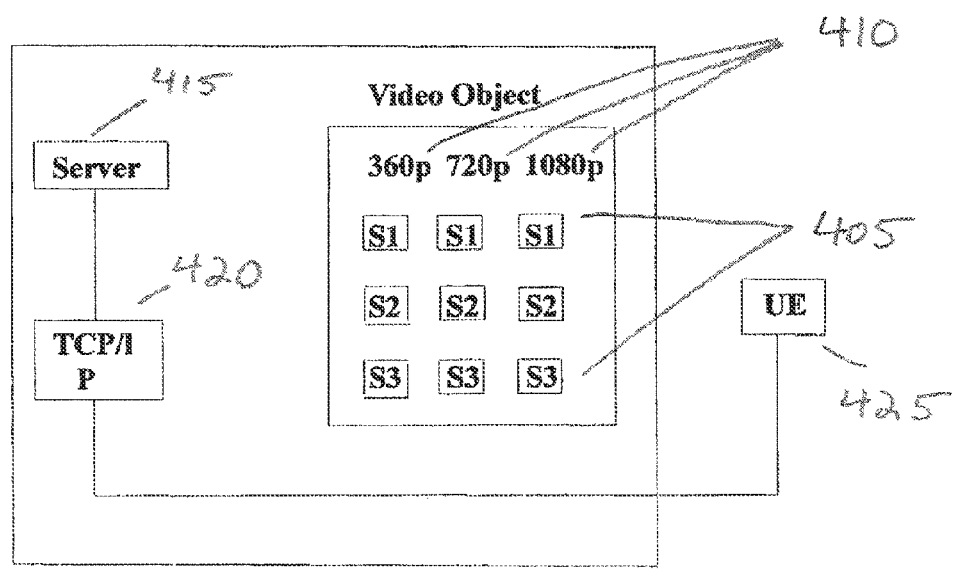
FIG. 4 is a block diagram.

As described above, mobile video delivery process 100 splits (104) multi-media content, such as flash video (FLV video), into small chunks 405, where each segment is a playable unit (i.e., start from a key frame such as I-frame). As shown in FIG. 4, different bit-rate versions 410 for each segment 405 are created and registered to the media server 415, so that the media server can select an appropriate version for a segment transmission as the available bandwidth changes.

For example, in the case of FLV video streaming over Hypertext Transfer Protocol (HTTP), a FLV video header has a video file size based on the highest bit rate content. This size is also used for a Content-Size header field of a HTTP response header in case the chunked encoding is not supported by the HTTP server or client. At each segment transmission interval, the HTTP server estimates the available bandwidth of the Transmission Control Protocol (TCP) link 420 using a bandwidth estimation technique and chooses a version of the segment of which the bit rate best fits the estimated TCP link bandwidth.

The HTTP media server acts as a HTTP media proxy server deployed within a 3G, 4G access network (AN), behind the PGW or PDSN as part of the AN infrastructure and can obtain more information about a client device or service plan, and can determine an upper limit of content for the device accordingly. For example, there is no need to stream HD quality video for a smart phone due to the limited screen size of the device. Thus, the media server will not even make an attempt to serve high definition (HD) quality media segments although available.

Bandwidth estimation can include one of several methods. For example, bandwidth estimation can be a TCP based bandwidth estimation method that is agnostic of the wireless access protocol. In this example, bandwidth estimation is performed by a media server without help of a media player on the other end by monitoring the media server's TCP socket queue length. A proxy server can use any of the following data and techniques in determining the bandwidth of the TCP connection of the client. First, getting the TCP socket queue length periodically and determine the drain rate. Second, run an Active Queue Management (AQM) process, such as RED or PI-controller, on the socket queue length to detect impending congestion on the TCP link, and estimate bandwidth.

This TCP link bandwidth estimation technique is guaranteed to work for an AN's HTTP media proxy server, since the TCP connection is terminated at the mobile device/UE 425, which is not the case for general HTTP media servers outside the AN. FIG. 4 depicts the behavior of the server.

Another bandwidth estimation process that can be employed is X2 interface based bandwidth estimation for LTE networks. This method may be used by core elements, such as the SGW/PGW/video optimizers, to determine cell-load on eNBs (base stations) in an LTE network. Typically congestion occurs over an air interface and therefore this information reflects a relatively accurate view of the bandwidth available in an access network. The LTE architecture does not specify any methods by which this information is exchanged between the access and core networks, so the present invention takes advantage of the X2 application protocol (X2AP) interface on the eNBs over which cell loading information is exchanged and can use either of two methods. In a first method, a core network element implements X2AP protocol with an eNB. In a second method, a core network element acts as a router and all communication between any eNBs goes through the core network element. The core network element then sniffs X2 traffic between the eNBs to determine cell loading.

In general, the X2AP protocol runs between any two eNBs. X2AP handles global procedures and user equipment (UE) mobility procedures within E-UTRAN, and provides the following functions:

Function: Mobility Management
Elementary procedures: (a) Handover Preparation; (b) SN Status Transfer; (c) UE Context Release; and (d) Handover Cancel
Function: Load Management
Elementary procedures: (a) Load Indication; (b) Resource Status Reporting Initiation; and (c) Resource Status Reporting
Function: Reporting of General Error Situations
Elementary procedure: Error Indication
Function: Resetting the X2
Elementary procedure: Reset
Function: Setting up the X2
Elementary procedure: X2 Setup
Function: eNB Configuration Update
Elementary procedures: (a) eNB Configuration Update; and (b) Cell Activation
Function: Mobility Parameters Management
Elementary procedure: Mobility Settings Change
Function: Mobility Robustness Optimization
Elementary procedures: (a) Radio Link Failure Indication; and (b) Handover Report
Function: Energy Saving
Elementary procedures: (a) eNB Configuration Update; and (b) Cell Activation In the first method, the core network element establishes X2AP protocol with each eNB of interest. The protocol of interest is Load Management and the following messages are of interest:

Load Indication: an eNB initiates the procedure by sending a LOAD INFORMATION message to eNBs controlling intra-frequency neighboring cells. The IE of interest is "UL Interference Overload Indication IE," which indicates the interference level experienced by the indicated cell on all resource blocks.

Resource Status Reporting Initiation: This is a procedure used by an eNB to request the reporting of load measurements to another eNB.

In the request message, the requesting side can request Radio Resource load, Hardware Load and S1 Load Ies, which contains appropriate load information being experienced on the cell. The load state is either low-load, medium-load, high-load or overload.

These responses can be periodically generated based on the registration schemes set in the request message and can be cancelled if required.

In the second method, all X2AP messages are routed through the core network element, i.e., the core network element is used to provide connectivity across the eNBs. The messages of interest are sniffed and the rest are passed through. Cell loading information is obtained by sniffing these messages.

Various implementations of the systems and techniques described here can be realized in digital electronic circuitry, integrated circuitry, specially designed ASICs (application specific integrated circuits), computer hardware, firmware, software, and/or combinations thereof These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back-end component (e.g., a data server), or that includes a middleware component (e.g., an application server), or that includes a front-end component (e.g., a client computer having a graphical user interface or a web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The foregoing description does not represent an exhaustive list of all possible implementations consistent with this disclosure or of all possible variations of the implementations described. A number of implementations have been described. Nevertheless, it will be understood that various modifications may be made without departing from the spirit and scope of the systems, devices, methods and techniques described here. For example, various forms of the flows shown above may be used, with steps re-ordered, added, or removed. Accordingly, other implementations are within the scope of the following claims.

What is claimed is:

1. A method comprising:
   in a mobile network comprising at least a core element and one or more evolved Node Bs (eNBs), receiving a request to initiate a progressive download of a video object;
   splitting the requested video object into self-contained independent video segments;
   transrating each of the self-contained independent video segments for different rates;

determining, using bandwidth estimation, a current network condition of a network, wherein bandwidth estimation comprises a combination of:
Transmission Control Protocol (TCP) based bandwidth estimation, and
X2 interface based bandwidth estimation for Long Term Evolution (LTE) networks; and
delivering a segment from a rate bucket suitable for the current network condition determined by the bandwidth estimation,
wherein the TCP based bandwidth estimation comprises monitoring a media server's TCP socket queue length,
further wherein monitoring the media server's TCP socket queue length comprises:
obtaining the TCP socket queue length periodically to determine a drain rate, and
executing an Active Queue Management (AQM) process on the TCP socket queue length to detect impending congestion on the TCP link.

2. The method of claim 1 wherein each of the self-contained independent video segments is a playable unit.

3. The method of claim 1 wherein transrating each of the self-contained independent video segments for different rates further comprises registering each of the different bit rate versions with a media server so that the media server can select an appropriate version for a segment transmission as available bandwidth changes.

4. The method of claim 1 wherein the X2 interface based bandwidth estimation for LTE networks comprises:
establishing X2AP protocol with each eNB;
initiating a load indication;
initiating a resource status reporting; and
determining a resource status reporting.

5. The method of claim 1 wherein the X2 interface based bandwidth estimation for LTE networks comprises:
routing all X2AP messages through the core network element; and
for messages of interest, initiating a load indication, initiating a resource status reporting, and determining a resource status reporting.

6. A server in a mobile network comprising:
one or more central processing units (CPUs); and
a memory, the memory comprising an operating system (OS) and machine readable instructions that when executed cause:
at least one of the one or more CPUs to receive a request to initiate a progressive download of a video object;
at least one of the one or more CPUs to split the requested video object into self-contained independent video segments;
at least one of the one or more CPUs to transrate each of the self-contained independent video segments for different rates;
at least one of the one or more CPUs to determine, using bandwidth estimation, a current network condition of a network, wherein bandwidth estimation comprises a combination of:
Transmission Control Protocol (TCP) based bandwidth estimation, and X2 interface based bandwidth estimation for Long Term Evolution (LTE) networks, and
at least one of the one or more CPUs to deliver a segment from a rate bucket suitable for the current network condition determined by the bandwidth estimation,
wherein the TCP based bandwidth estimation comprises monitoring a media server's TCP socket queue length,
further wherein monitoring the media server's TCP socket queue length comprises:
obtaining the TCP socket queue length periodically to determine a drain rate, and
executing an Active Queue Management (AQM) process on the TCP socket queue length to detect impending congestion on the TCP link.

7. The server of claim 6 wherein each of the self-contained independent video segments is a playable unit.

8. The server of claim 6 wherein transrating each of the self-contained independent video segments for different rates further comprises registering each of the different bit rate versions with a media server so that the media server can select an appropriate version for a segment transmission as available bandwidth changes.

9. The server of claim 6 wherein the X2 interface based bandwidth estimation for LTE networks comprises:
establishing X2AP protocol with each eNB;
initiating a load indication;
initiating a resource status reporting; and
determining a resource status reporting.

10. The server of claim 6 wherein the X2 interface based bandwidth estimation for LTE networks comprises:
routing all X2AP messages through the core network element; and
for messages of interest, initiating a load indication, initiating a resource status reporting, and determining a resource status reporting.

* * * * *